(12) United States Patent
Takahashi et al.

(10) Patent No.: US 7,315,652 B2
(45) Date of Patent: Jan. 1, 2008

(54) IMAGE PROCESSING APPARATUS

(75) Inventors: Kenichi Takahashi, Osaka (JP);
Kaitaku Ozawa, Toyonaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 859 days.

(21) Appl. No.: 10/669,259

(22) Filed: Sep. 25, 2003

(65) Prior Publication Data

US 2004/0179609 A1 Sep. 16, 2004

(30) Foreign Application Priority Data

Oct. 9, 2002 (JP) ............................ P2002-295978

(51) Int. Cl.
| | |
|---|---|
| *G06K 9/00* | (2006.01) |
| *G06K 9/36* | (2006.01) |
| *G06K 9/46* | (2006.01) |
| *G06F 7/00* | (2006.01) |
| *G06F 15/00* | (2006.01) |
| *H04B 1/66* | (2006.01) |
| *H04N 7/12* | (2006.01) |
| *H04N 11/02* | (2006.01) |
| *H04N 11/04* | (2006.01) |

(52) U.S. Cl. ...................... 382/233; 382/166; 382/248; 375/240.19; 708/203

(58) Field of Classification Search ................ 382/166, 382/233, 248, 250; 345/395.1, 403.1; 375/240.18, 375/240.19, 240.2; 708/203
See application file for complete search history.

(56) References Cited

U.S. PATENT DOCUMENTS 6,404,919 B1 6/2002 Nishigaki et al.

(Continued)

FOREIGN PATENT DOCUMENTS

| JP | 8-63573 | 3/1996 |
|---|---|---|
| JP | 11-103388 | 4/1999 |
| JP | 2000-50268 | 2/2000 |
| JP | 2001-218062 | 8/2001 |

OTHER PUBLICATIONS

Grosbois et al. ("New Approach to JPEG 2000 Compliant Region of Interest Coding," SPIE, vol. 4472, 2001, pp. 267-275).*

(Continued)

*Primary Examiner*—Matthew C. Bella
*Assistant Examiner*—Yubin Hung
(74) *Attorney, Agent, or Firm*—Buchanan Ingersoll & Rooney PC

(57) ABSTRACT

An image processing apparatus for decoding a compressed image data, the image data being divided to a plurality of tiles, each of which is a basic unit of process in encoding or decoding process, said apparatus comprising: a detector which detects an existence status of ROI within said compressed image data based on a frequency transform coefficient of said tile for every tile; a determiner which determines whether each tile is a ROI tile composed of only ROI, a non-ROI tile composed of only non-ROI, or a ROI boundary tile composed of ROI and non-ROI based on said existence status of ROI detected by said detector; a processor which shifts only frequency transform coefficient of said ROI within each tile to lower bit side for said ROI tile and said non-ROI tile determined by said determiner, and which shifts frequency transform coefficients of both ROI and non-ROI within each tile to lower bit side.

20 Claims, 11 Drawing Sheets

U.S. PATENT DOCUMENTS

| | | | |
|---|---|---|---|
| 6,665,446 B1 * | 12/2003 | Kato | 382/251 |
| 6,801,665 B1 * | 10/2004 | Atsumi et al. | 382/239 |
| 6,804,405 B2 * | 10/2004 | Christopoulos et al. | 382/243 |
| 6,968,088 B2 * | 11/2005 | Maeda et al. | 382/239 |
| 6,985,632 B2 * | 1/2006 | Sato et al. | 382/240 |

OTHER PUBLICATIONS

Wang et al. ("Bitplane-by-Bitplane Shift (BbBShift)-A suggestion for JPEG2000 Region of Interest Image Coding," IEEE Signal Processing Letters, vol. 9, No. 5, May 2002, pp. 160-162).*

* cited by examiner

IMAGE PROCESSING APPARATUS

This application is based on application No. 2002-295978 filed in Japan, the contents of which is hereby incorporated by reference.

BACKGROUND OF THE INVENTION

1. Field of the Invention

The present invention is directed to an image processing apparatus for manipulating an image, such as copier, printer, scanner and so on.

2. Description of the Related Art

Presently, a JPEG format has been generally used as an encoding format to compress a still image, which compresses an image data using a discrete cosine transform. However, in late years, for the purpose of providing improved compression performance and extended function, development and distribution of a JPEG 2000 format has been promoted, which compresses an image data using a wavelet transform. As a feature of this JPEG 2000 format, it is known to optionally identify a specific region in image data as a region of interest (hereinafter, referred to as ROI) by encoding the specific region prior to other regions to allow the specific region to be recognized roughly at an initial stage in transmitting the image data, or by encoding the specific region in image data in higher quality than other regions, as disclosed in Japan Patent laid-open publication 2001-218062.

However, generally, for example in case of printing a JPEG 2000 file including a ROI, it tends to become difficult to identify a ROI from a printed image if an image data has a ROI of which its boundary is obscure, if a plurality of ROIs are included in image data, or if ROI is a relatively small region.

To resolve this problem, as a method for bringing the ROI into clear view by adding an outline to ROI, it is known to generate mask information indicative of position for pixel set to ROI from quantized values of frequency transform coefficient (Wavelet transform coefficient) and perform bit-map decompression. However, this method has a defect that high-capacity storage area is needed to store a ROI mask information.

SUMMARY OF THE INVENTION

Therefore, it is an object of the present invention to provide an image processing apparatus for obtaining an output from which a ROI in image data can be identified precisely and completely, without requiring high-capacity storage area.

In an aspect of the present invention, there is provided an image processing apparatus for decoding a compressed image data, the image data being divided to a plurality of tiles, each of which is a basic unit of process in encoding or decoding process, the image processing apparatus comprising: a detector which detects an existence status of ROI set within said compressed image data; a determiner which determines whether each tile is a ROI tile composed of only ROI, a non-ROI tile composed of only non-ROI, or a ROI boundary tile composed of ROI and non-ROI based on said existence status of ROI detected by said detector; a processor which shifts only frequency transform coefficient of said ROI set within each tile to lower bit side for said ROI tile and said non-ROI tile determined by said determiner, and which shifts frequency transform coefficients of both ROI and non-ROI set within each tile to lower bit side.

According to this aspect, for example, it is possible to cause transform coefficient of frequency component corresponding to non-ROI to be zero so that ROI within ROI boundary tile can be set in black, and thus, a bordering line can be added on the outline of ROI. Accordingly, it is possible to generate an output from which a ROI can be recognized properly and without omission.

Said detector may detect the existence status of ROI set based on a frequency transform coefficient of said tile for every tile.

Said processor may shift a frequency transform coefficient corresponding to non-ROI to lower bit side for a tile which abuts with said ROI boundary tile among said non-ROI tiles determined by said determiner.

According to this feature, non-ROI tiles which abut with ROI boundary tiles can be set in black, and thus, thickness of said bordering line added to the outline of ROI can be varied. Accordingly, it is possible to generate an output from which a ROI can be recognized more properly and without omission.

In another aspect of the present invention, there is provided an image processing apparatus for decoding a compressed image data, the image data being divided to a plurality of tiles, each of which is as a basic unit of process in encoding or decoding process, the image processing apparatus comprising: a detector which detects an existence status of ROI set within said compressed image data; a determiner which determines whether each tile is a ROI tile composed of only ROI, a non-ROI tile composed of only non-ROI, or a ROI boundary tile composed of ROI and non-ROI based on said existence status of ROI detected by said detector; a processor which performs a specific process for frequency transform coefficients of ROI and non-ROI within each tile for luminance component and color difference component of each tile determined by said determiner.

According to this aspect, ROI and non-ROI can be set in different colors, respectively, and thus, it is possible to generate an output from which a ROI can be recognized properly and without omission.

Said detector may detect the existence status of ROI set based on a frequency transform coefficient of said tile for every tile.

Said processor may shift only frequency transform coefficients corresponding to ROI to lower bit side for luminance component and color difference component of ROI tile determined by said determiner, shift frequency transform coefficients corresponding to non-ROI to lower bit side for color difference component determined by said determiner and shift frequency transform coefficients corresponding to ROI to lower bit side for luminance component of ROI boundary tile determined by said determiner while shifting frequency transform coefficients corresponding to both ROI and non-ROI to lower bit side for color difference component of ROI boundary tile.

According to this feature, ROI in image data can be displayed in full color while displaying non-ROI in monochrome and thus, it is possible to generate an output from which ROI can be recognized properly and without omission.

In another aspect of the present invention, there is provided an image processing apparatus for decoding a compressed image data, the image data being divided to a plurality of tiles, each of which is a basic unit of process in encoding or decoding process, the image processing apparatus comprising: a detector which detects an existence status of ROI set within said compressed image data; a determiner which determines whether each tile is a ROI tile composed of only ROI, a non-ROI tile composed of only non-ROI, or a ROI boundary tile composed of ROI and non-ROI based on said existence status of ROI detected by said detector; a processor which performs a first process for said ROI tile and said non-ROI tile determined by said determiner, and which performs a second process for said ROI boundary tile determined by said determiner.

According to this aspect, it is possible to generate an output from which a ROI can be recognized properly and without omission.

Said first process may be shifting only frequency transform coefficient of said ROI set within each tile to lower bit side for said ROI tile and said non-ROI tile determined by said determiner, and said second process may be shifting frequency transform coefficients of both ROI and non-ROI set within each tile to lower bit side for said ROI boundary tile determined by said determiner.

According to this feature, for example, it is possible to cause transform coefficient of frequency component corresponding to non-ROI to be zero so that ROI within ROI boundary tile can be set in black, and thus, a bordering line can be added on the outline of ROI. Accordingly, it is possible to generate an output from which a ROI can be recognized properly and without omission.

Alternatively, said first process may be shifting only frequency transform coefficient of said ROI to lower bit side for luminance component and color difference component of said ROI tile determined by said determiner and shifting frequency transform coefficient of said non-ROI to lower bit side for color difference component of said non-ROI tile determined by said determiner, and said second process may be shifting only frequency transform coefficient of said ROI to lower bit side for luminance component of said ROI boundary tile determined by said determiner and shifting frequency transform coefficients of both ROI and non-ROI to lower bit side for color difference component of said ROI boundary tile.

According to this feature, ROI and non-ROI can be set in different colors, respectively, and thus, it is possible to generate an output from which a ROI can be recognized properly and without omission.

In another aspect of the present invention, there is provided a method of processing image for decoding a compressed image data, the image data being divided to a plurality of tiles, each of which is a basic unit of process in encoding or decoding process, the method comprising steps of: detecting an existence status of ROI set within said compressed image data; determining whether each tile is a ROI tile composed of only ROI, a non-ROI tile composed of only non-ROI, or a ROI boundary tile composed of ROI and non-ROI based on said existence status of ROI detected by said detector; performing a first process for said ROI tile and said non-ROI tile determined by said determiner, and performing a second process for said ROI boundary tile determined by said determiner.

According to this aspect, it is possible to generate an output from which a ROI can be recognized properly and without omission.

DETAILED DESCRIPTION OF THE PREFERRED EMBODIMENTS

Embodiments of the present invention will be described below with reference to the accompanying drawings.

First Embodiment

Figure 1:
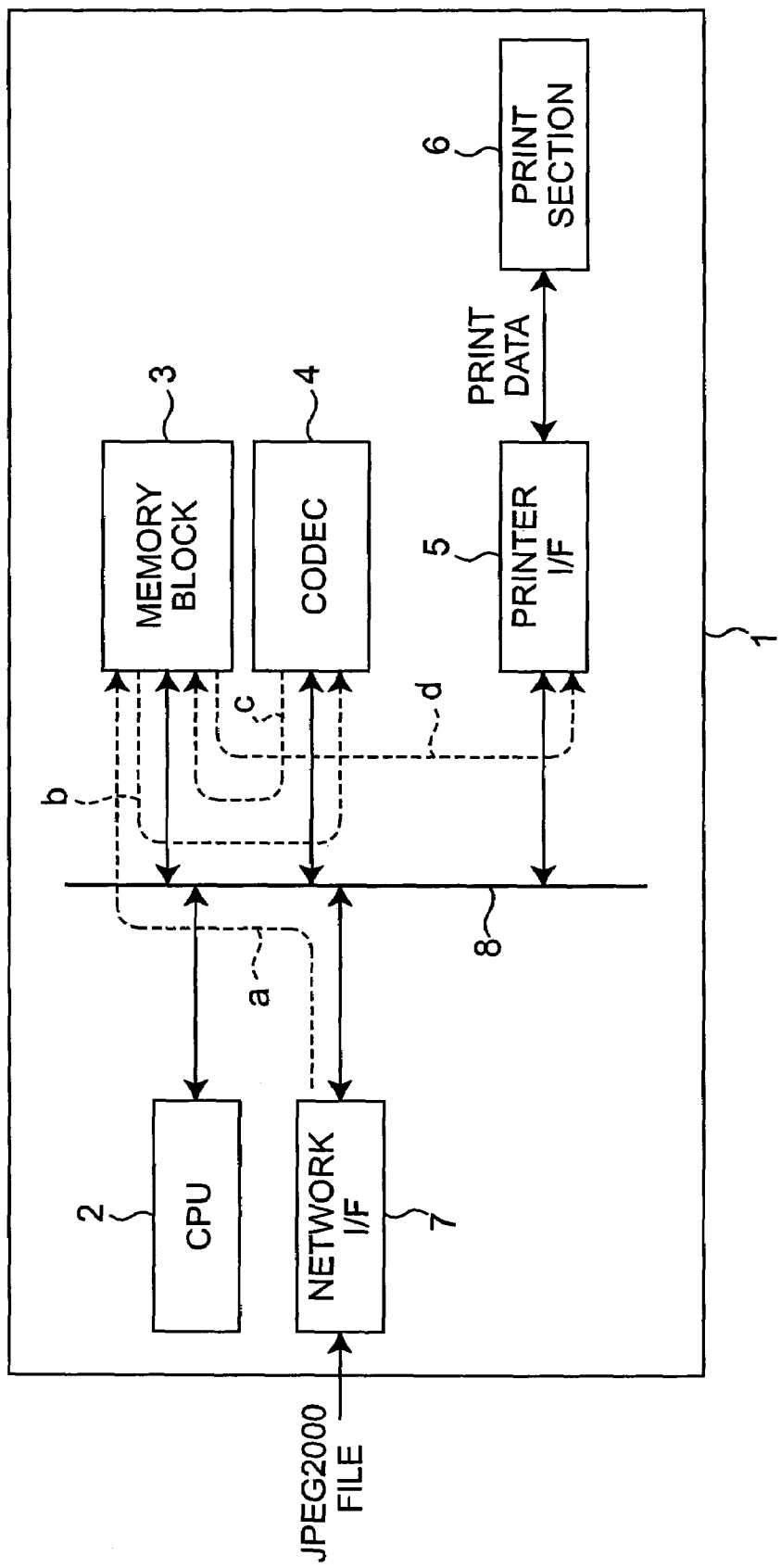
FIG. 1 is a block diagram illustrating an internal configuration of an image processing apparatus according to one embodiment of the present invention.

FIG. 1 is a block diagram illustrating an internal configuration of an image processing apparatus according to first embodiment of the present invention. In FIG. 1, an example is shown, in which a Direct Print is performed, that is, a JPEG 2000 file is provided directly to an image processing apparatus 1 via a network from Internet or other computers, processed, and output to be printed. It is noted that a source for providing a JPEG file in Direct Print is not limited to Internet or other computers, and external devices such as a digital camera, scanner, or recording media such as Compact Flash (TM), Smart Media (TM) may be used.

The Image processing apparatus 1 has a CPU 2 connected to a bus 8 used in common with other components, a memory block 3, a Codec 4 for JPEG 2000 file, a printer Interface 5 (noted as "PRINTER I/F" in FIG. 1), a print section 6 and a network interface 7 (noted as "NETWORK I/F" in FIG. 1). In the image processing apparatus 1, Direct Memory Access (DMA) is performed for data transfer between components other than CPU 2 and the memory block 3, and CPU 2 controls DMA start to manage steps from file input to print data output.

In image processing apparatus 1, when a JPEG 2000 file is externally input via network, the file is transferred from network interface 7 to memory block 3 via a path "a" firstly. An encoded data constructing a JPEG file is stored in memory block 3, and transferred to Codec 4 via a path "b" sequentially.

In Codec 4, the encoded data is decoded. By using Codec 4, when a JPEG file including a ROI is manipulated, a process for emphasizing a ROI can be performed, as will hereinafter be described in detail. The decoded data is transferred to memory block 3 via a path "c".

In memory block 3, a bitmap data is generated in an area based on decoded data that have been transferred. The bitmap data is transferred to printer interface 5 via a path "d" every time that one page of the bitmap data has been generated and then output to print section 6 as a print data.

Figure 2:
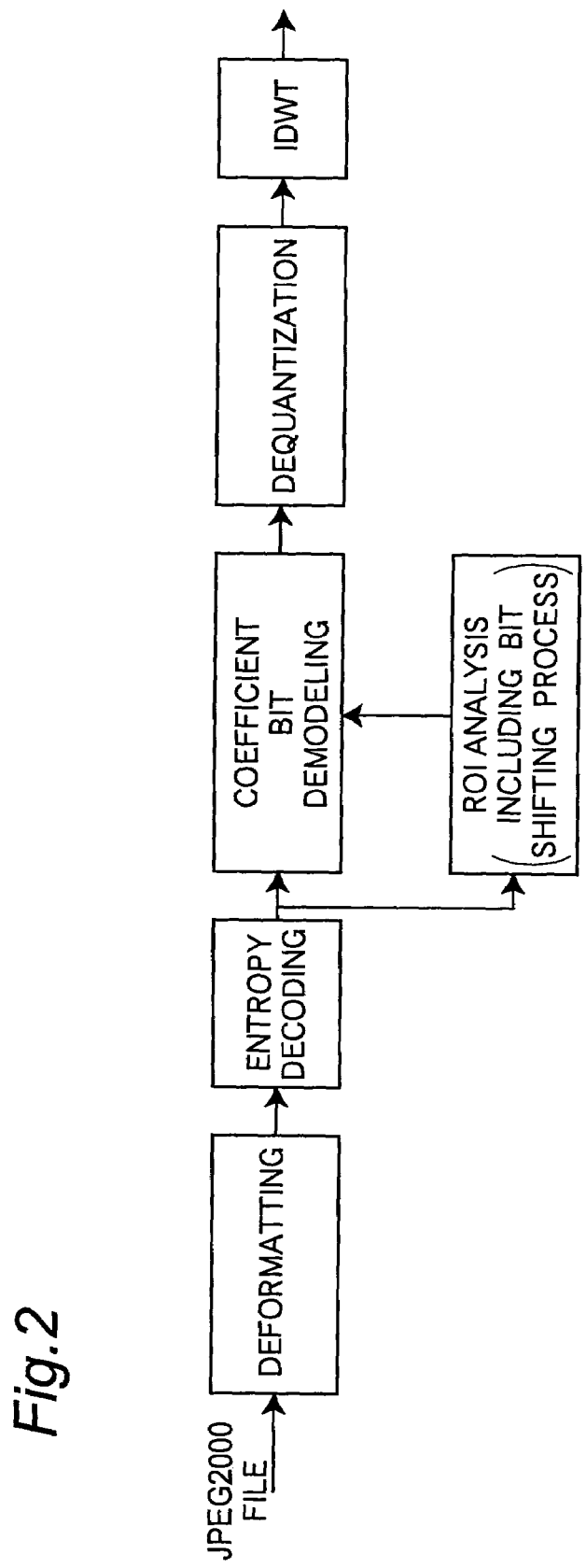
FIG. 2 shows a process flow of decoding a JPEG 2000 file using a CODEC contained in the image processing apparatus.

FIG. 2 is a diagram illustrating a flow for decoding a JPEG 2000 file by Codec 4 in the image processing apparatus 1. It will be described for a case in which an image data is divided to a plurality of rectangular tiles, each of which is a basic unit of process in wavelet transform and it is determined for each tile whether it is a tile composed of only ROI (hereafter referred to as "ROI tile"), a tile composed of only region which is not region of interest (hereafter referred to as "non-ROI tile") or a tile existing on the boundary of ROI and composed of ROI and non-ROI (hereafter referred to as "ROI boundary tile").

First, a JPEG 2000 file input into Codec 4 is deformatted. In this deformatting process, an encoded string of JPEG 2000 file is analyzed, and a ROI information described on header contained in strings of JPEG 2000 file is read. As will hereinafter be described in detail, in general, a JPEG 2000 file including ROI is encoded with quantized values of wavelet transform coefficient which correspond to ROI being shifted to Most Significant Bit (MSB) side by "S" bits in relation to that of non-ROI. The ROI information described above is of representing bit shift amount "S" by which the transform coefficient corresponding to ROI is shifted.

After deformatting process, the encoded data is entropy decoded. The decoded data is composed of a plurality of bit planes and sub bit planes, each of planes is parallel to each other. Then, coefficient bit modeling is dissolved (coefficient bit demodeling), and therefore, a transform coefficient is obtained.

Based on the transform coefficient obtained as described above, a ROI is analyzed. As will hereinafter be described in detail referring to FIG. 8, first, an existence status of ROI within tile in progress is detected and it is determined whether it is a ROI tile, a non-ROI tile or a ROI boundary tile. Then, based on the determination result and the ROI information read in file inputting, a transform coefficient is obtained, which is generated by shifting the transform coefficient after coefficient bit demodeling by a bit shift amount (for example, bit shift amount "S").

If the JPEG 2000 file is of being quantized in advance, continuously, components of each color is generated by reverse wavelet transforming the data.

Figure 3:
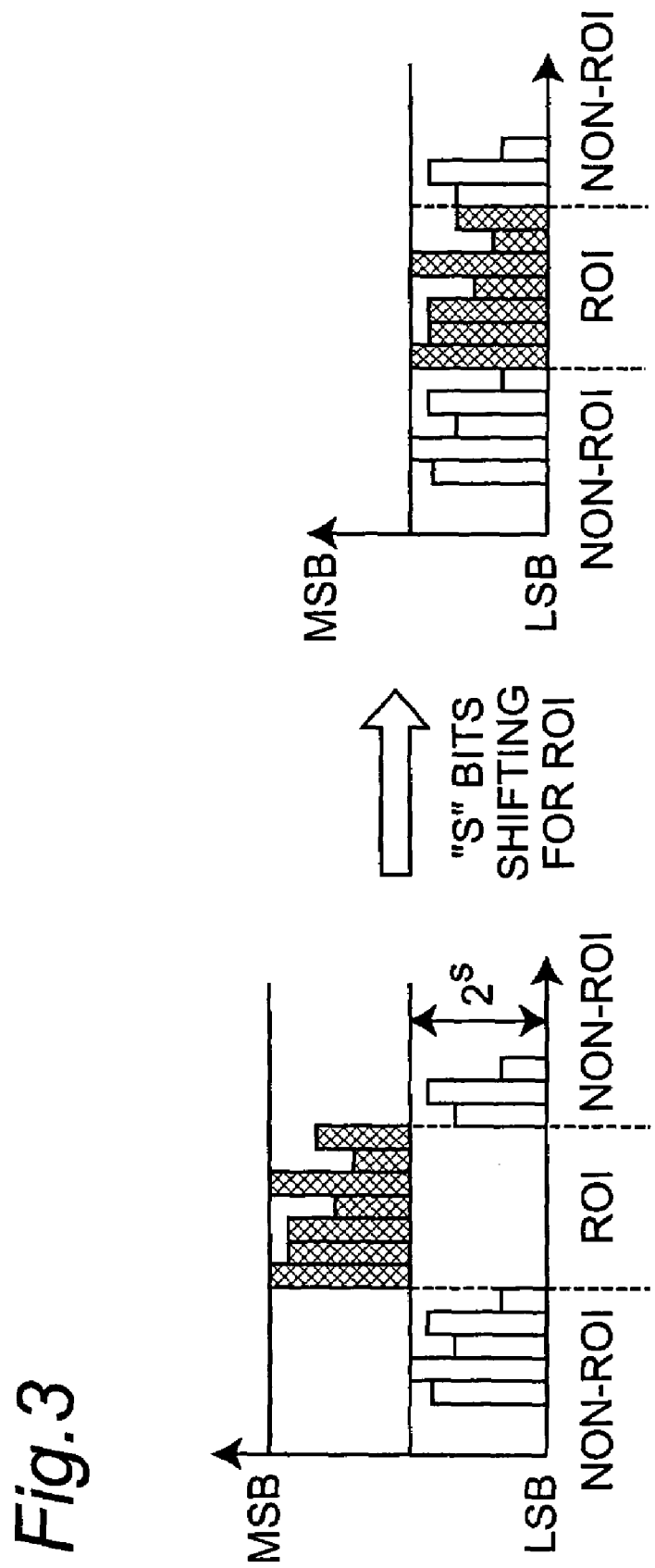
FIG. 3 is a schematic view of a max-shift method which is exemplary as a method for distinguishing ROI from non-ROI in a JPEG 2000 file.

As described above, a JPEG 2000 file including a ROI is decoded with quantized values of wavelet transform coefficient which correspond to ROI being shifted to MSB side by "S" bits in relation to that of non-ROI, and this is the result of employing the max-shift method which is typical as a method for identifying ROI and non-ROI in a JPEG 2000 file. FIG. 3 is a schematic diagram illustrating such max-shift method.

In general, when ROI is set on a JPEG 2000 file, first, a mask information representing pixel position defined by ROI is generated, and next, a bit shift amount "S" is determined and quantized values of wavelet transform coefficient corresponding to all pixels are shifted to MSB side by "S" bits. Then, based on a mask information generated in advance, quantized values are shifted to Least Significant Bit (LSB) side by "S" bits for pixels other than pixels defined as ROI. As a result, as depicted on the left in FIG. 3, quantized values of the wavelet transform coefficient are shifted to MSB side by "S" bits for only pixels defined as ROI. And continuously, encoding process is performed.

In decoding such JPEG 2000 file, quantized values of wavelet transform coefficient beyond $2^s$ are recognized as corresponding to ROI, quantized values of these transform coefficient are shifted to LSB side by "S" bits as depicted on the right in FIG. 3 so that shifting by the max-shift method is dissolved.

Figure 4:
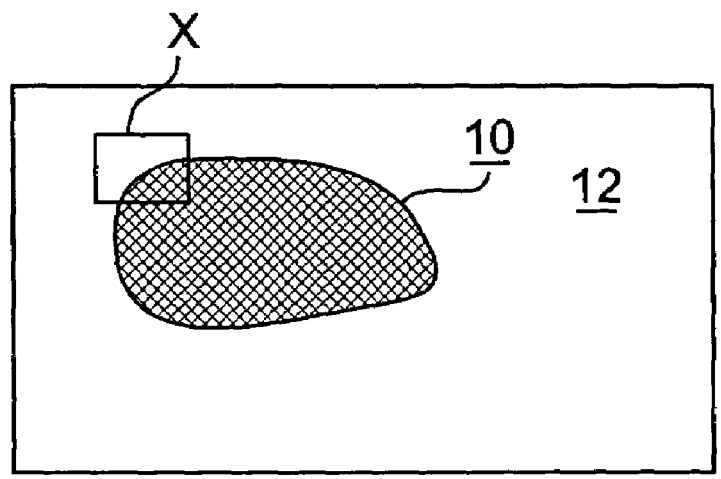
FIG. 4 shows an image data including a ROI.

FIG. 4 shows an example of image data including ROI 10. In FIG. 4, a region other than ROI 10 shaped arbitrarily is denoted as 12 to represent non-ROI.

Figure 5:
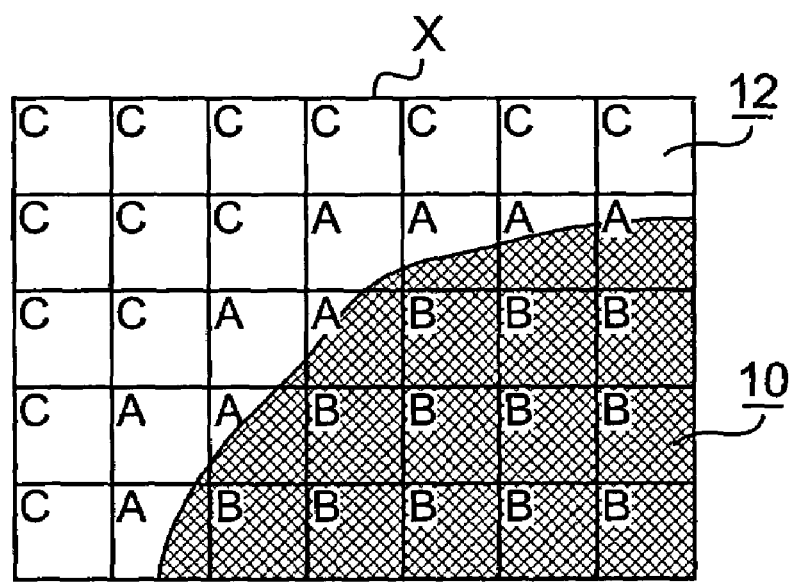
FIG. 5 is an enlarged view illustrating an inside of frame X.

Furthermore, FIG. 5 is an enlarged view illustrating an inside of frame X surrounding a region including ROI 10 and non-ROI 12 as shown in FIG. 4. As seen from FIG. 5, an image data is of being divided to a plurality of tiles, each of which is a basic unit of process in wavelet transform. The size of tile is different depending on the processing system to be used. For example, when a Multifunction Peripherals (MFP) is used as the image processing apparatus 1, it is appropriate to use about 128×128 as the size of tile due to restriction for memory capacity.

Furthermore, as shown in FIG. 5, numeral "A", "B" or "C" representing type of tile is appended on upper left of each tile. In particular, tile "A" is ROI boundary tile including ROI 10 and non-ROI 12, tile "B" is ROI tile composed of only ROI 10 and tile "C" is non-ROI tile composed of only non-ROI 12.

Figure 6:
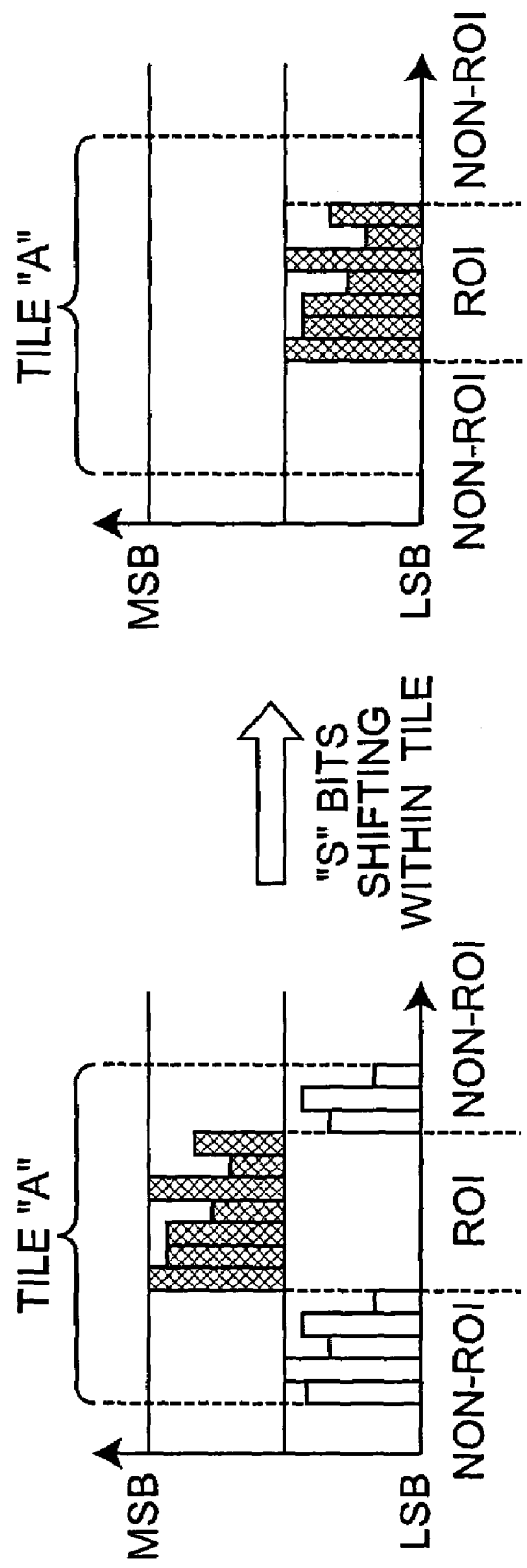
FIG. 6 is schematic view illustrating a bit shifting process performed to ROI boundary tile "A" in FIG. 5.

In first embodiment, if necessary, a common bit shifting process as shown in FIG. 3 is performed to ROI tile "B" and non-ROI tile "C", and on the other hand, a bit shifting process as shown in FIG. 6 is performed to ROI boundary tile "A" so that ROI 10 is emphasized.

FIG. 6 is a schematic view illustrating a bit shifting process performed to ROI boundary tile "A". As seen from FIG. 6, regardless of whether it corresponds to ROI or not, quantized values of all wavelet transform coefficient are shifted by "S" bits for ROI boundary tile "A".

Figure 7:
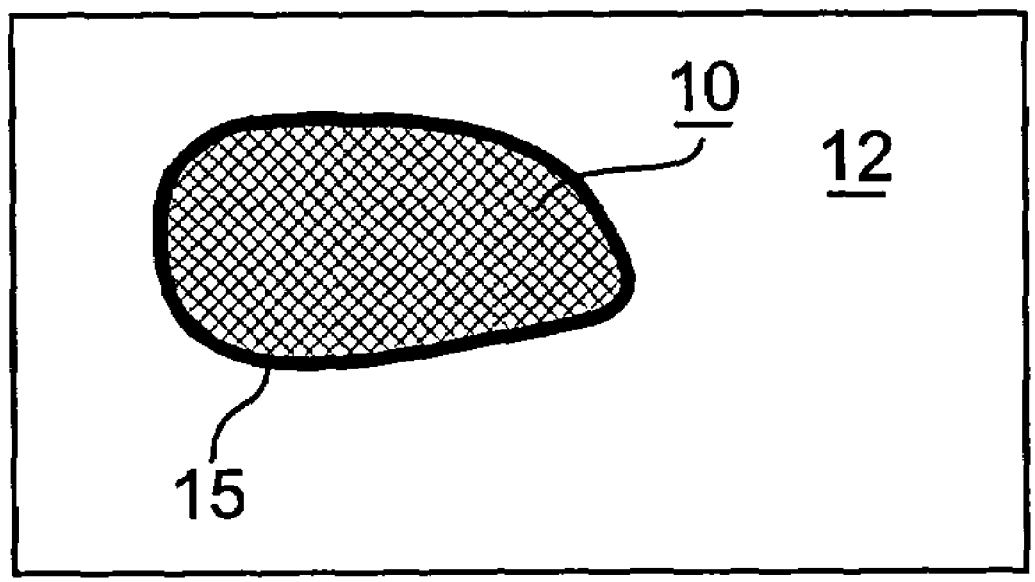
FIG. 7 shows an image data including an emphasized ROI.

By performing such processes, quantized values of wavelet transform coefficient corresponding to non-ROI become zero, and ROI 10 (filled portion) contained in ROI boundary tile "A" as shown in FIG. 5 can be set in black color. As a result, bordering line 15 can be added to a boundary of ROI 10 as shown in FIG. 7.

It is noted that only ROI boundary tile "A" is described above as target of bit shifting process in first embodiment, but it is not limited to such embodiment. For example, a process as shown in FIG. 6 may be performed to non-ROI tile "C" adjacent to ROI boundary tile "A". In this case, a line thickness of bordering line 15 added to a boundary of ROI 10 can be varied. Furthermore, in first embodiment, quantized values of wavelet transform coefficient is shifted by "S" bits for all pixels composing ROI boundary tile "A", but it is not limited to such embodiment. For example, quantized values of wavelet transform coefficient corresponding to non-ROI may be displaced with predetermined values.

Figure 8:
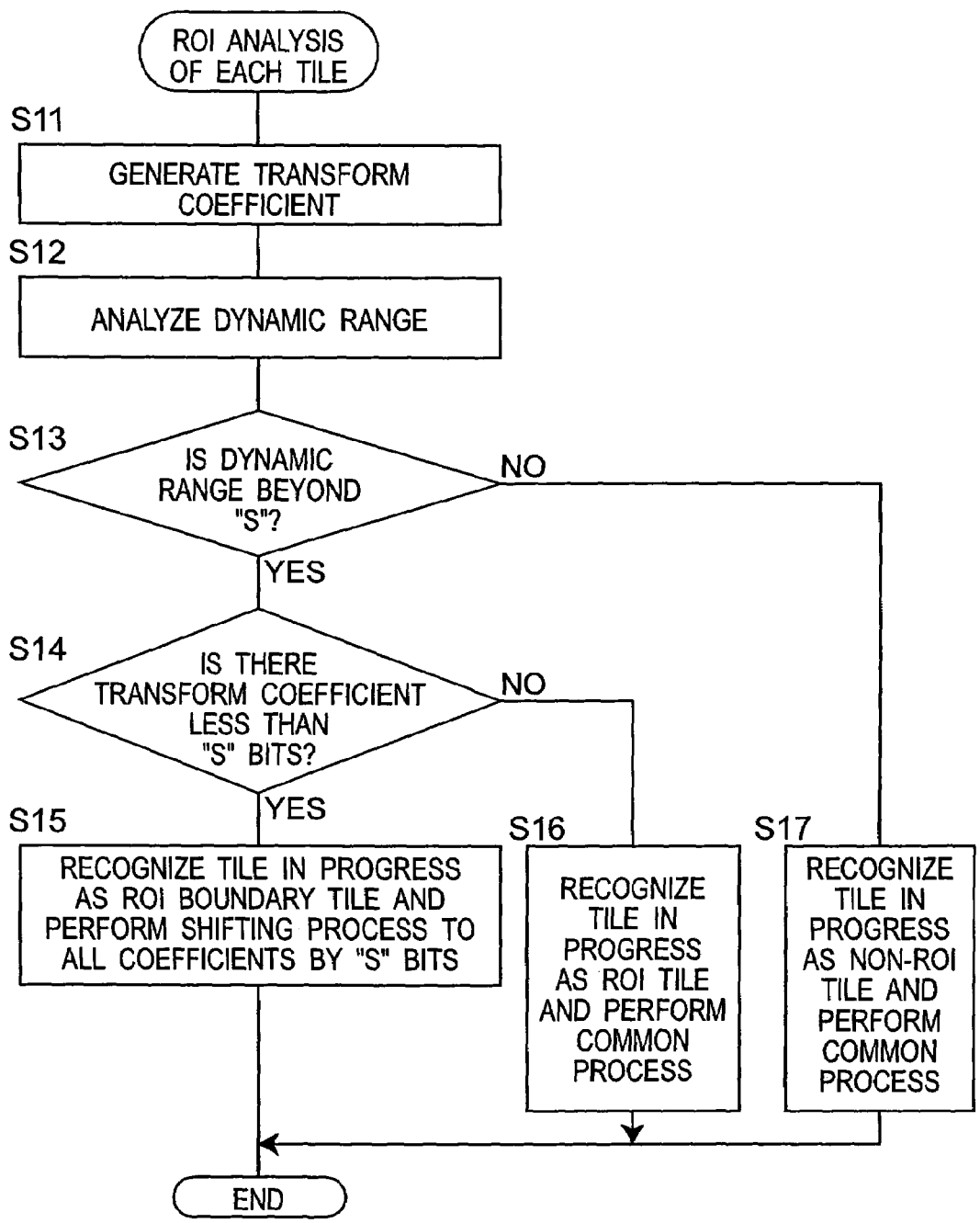
FIG. 8 is a flow chart of ROI analysis process for each tile according to the first embodiment of the present invention.

FIG. 8 is a flow chart of ROI analyzing process for each tile. In this process, first, a transform coefficient with coefficient bit modeling being terminated is generated (step 11). Next, a dynamic range (lower limit to upper limit) for generated transform coefficient is analyzed (step 12). That is, number of bits composing each transform coefficient is detected. Subsequently, it is determined whether the detected dynamic range is beyond bit shifting amount "S" of the max-shift method read from header contained in encoded strings of JPEG 2000 file (step 13).

As a result of step 13, when it is determined that the dynamic range is not beyond "S", the tile in progress is recognized as non-ROI tile "C" and a common process is performed (step 17). This is the end of the analyzing process.

On the other hand, as a result of step 13, when it is determined that the dynamic range is beyond "S", continuously it is determined whether there is a transform coefficient less than "S" bits in the tile (step 14). As a result of step 14, when it is determined that there is not a transform coefficient less than "S" bits, the tile in progress is recognized as ROI tile "B" and a common process is performed so that a transform coefficient for which shifting resulted from the max-shift method being dissolved is obtained (step 16). This is the end of the analyzing process.

On the other hand, as a result of step 14, when it is determined that there is a transform coefficient less than "S" bits, the tile in progress is recognized as ROI boundary tile "A" and a specific process is performed so that all transform coefficients in the tile is shifted to LSB side by "S" bits (step 15). And thus, wavelet transform coefficient corresponding to non-ROI in ROI boundary tile "A" become zero and a common bit shifting process is performed to quantized values of transform coefficients corresponding to ROI so that a transform coefficient for which shifting resulted from the max-shift method being dissolved is obtained. This is the end of the analyzing process.

In first embodiment, by performing specific processes to ROI boundary tile "A" as described above, the bordering line is added to outline of ROI in image data, and thus, it is possible to generate an output from which a ROI can be recognized properly and without omission.

Second Embodiment

In first embodiment as described above, a process for adding a bordering line to outline of ROI 10 is performed to emphasize ROI 10 contained in image data, and on the other hand, in second embodiment, a process for displaying ROI 10 in full color and non-ROI 12 in monochrome. Concretely speaking, in decoding a file, each tile is decomposed to luminance (Y) component and color difference (Cb, Cr) component and then, for each component, an appropriate bit shifting process is performed to the wavelet transform coefficient so that only ROI 10 contained in image data is displayed in full color.

Hereinafter, bit shifting processes performed to ROI tile "B", ROI boundary tile "A" and non-ROI tile "C", respectively, will be concretely described with referent to FIG. 9, FIG. 10 and FIG. 11.

Figure 9:
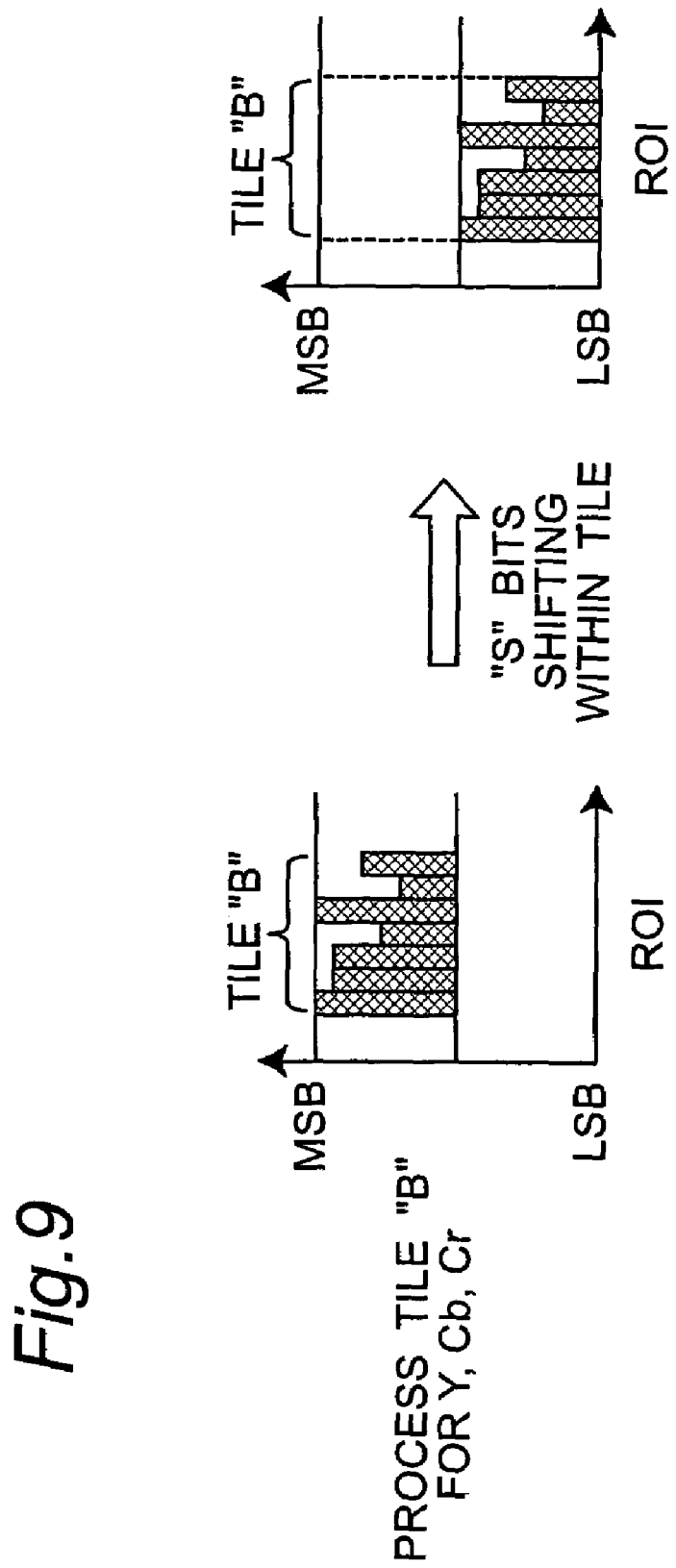
FIG. 9 is a schematic view illustrating a bit shifting process performed to ROI tile "B" for luminance component and color difference component.

FIG. 9 is a schematic view illustrating a bit shifting process performed to ROI tile "B" for Y, Cb, Cr components. As seen from FIG. 9, for all of Y, Cb, Cr components, quantized values of wavelet transform coefficient beyond $2^s$ (in this case, all values) is recognized as of corresponding to ROI, and a shifting process is performed so that quantized values of the transform coefficients is shifted to LSB side by "S" bits.

Accordingly, ROI tile "B" can be displayed in full color without lacking color information.

Figure 10A:
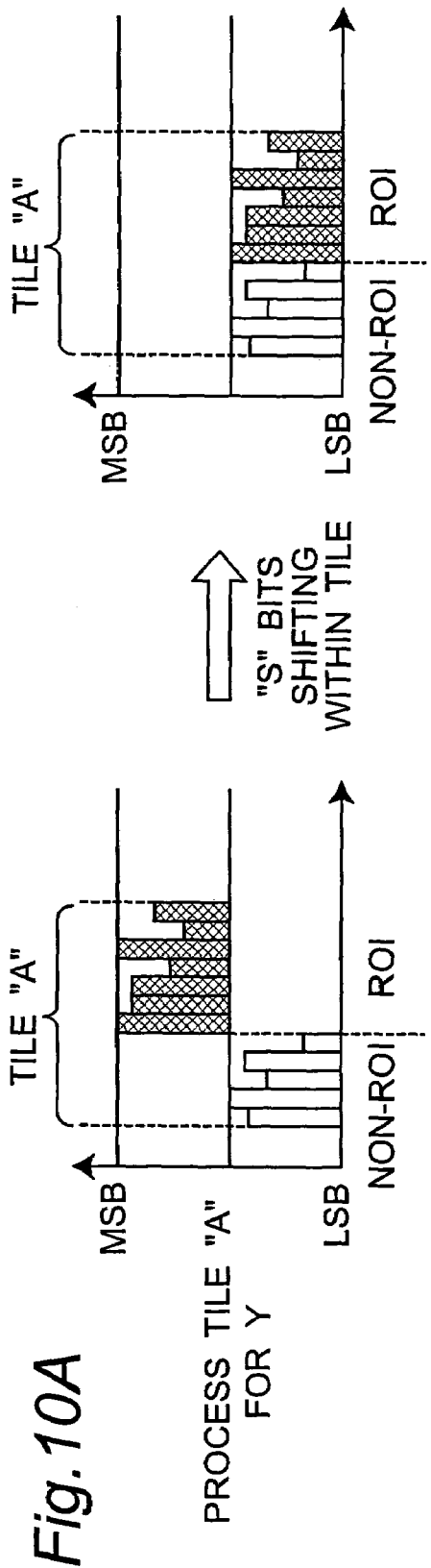
FIG. 10A is a schematic view illustrating a bit shifting process performed to ROI boundary tile "A" for luminance component.

FIG. 10A is a schematic view illustrating a bit shifting process performed to ROI boundary tile "A" for Y component. As seen from FIG. 10A, for Y component, quantized values of wavelet transform coefficient beyond $2^s$ are recognized as of corresponding to ROI, and a shifting process is performed so that only quantized values of the transform coefficients are shifted to LSB side by "S" bits.

Figure 10B:
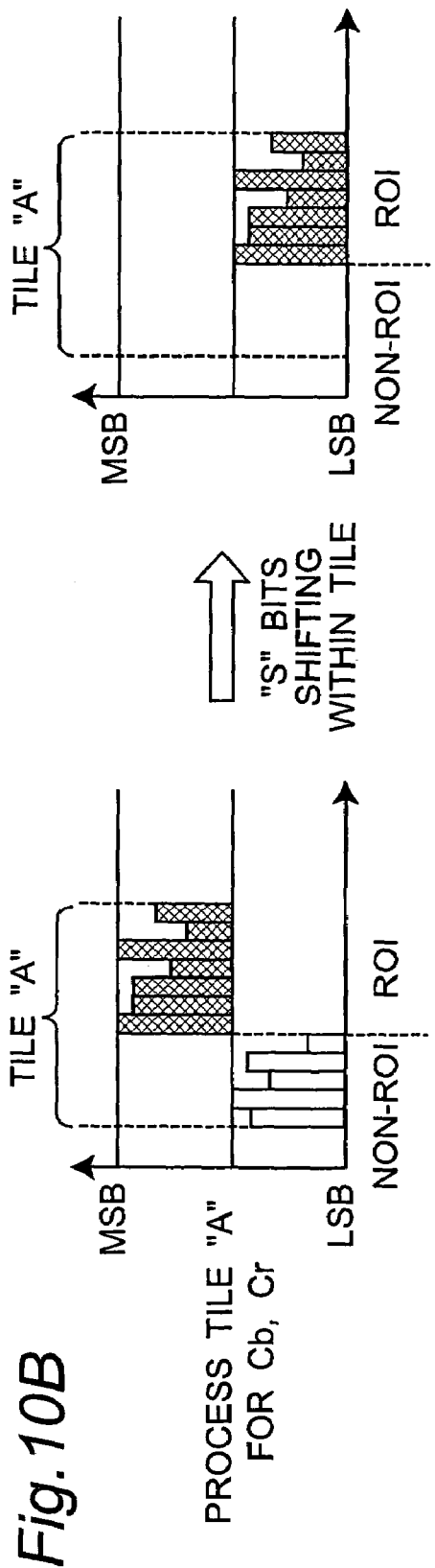
FIG. 10B is a schematic view illustrating a bit shifting process performed to ROI boundary tile "A" for color difference component.

On the other hand, FIG. 10B is a schematic view illustrating a bit shifting process performed to ROI boundary tile "A" for Cb, Cr components. As seen from FIG. 10B, a shifting process is performed to ROI boundary tile "A" for Cb, Cr components so that all quantized values of transform coefficient are shifted to LSB side by "S" bits.

Accordingly, ROI boundary tile "A" can be displayed in full color at ROI and in monochrome at non-ROI.

Figure 11A:
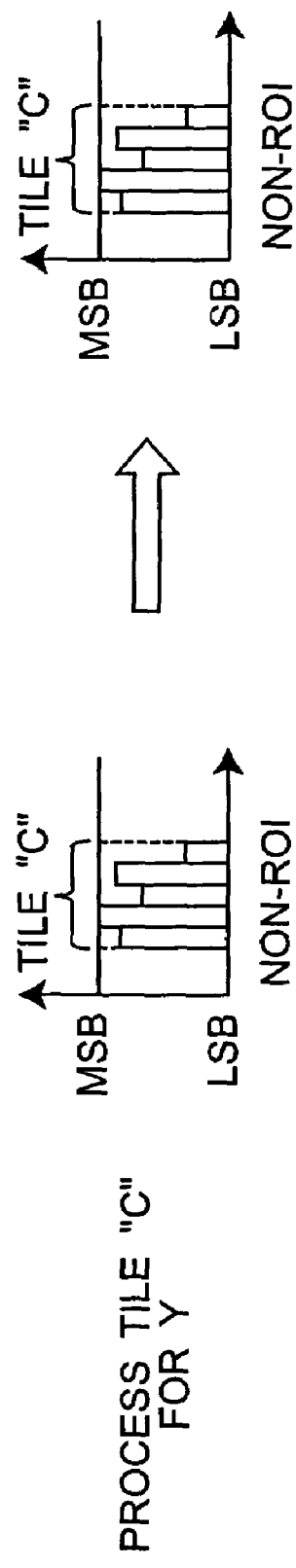
FIG. 11A is a schematic view illustrating a bit shifting process performed to non-ROI tile "C" for luminance component.

FIG. 11A is a schematic view illustrating a bit shifting process performed to non-ROI "C" for Y component. For non-ROI tile "C", quantized values of wavelet transform coefficient beyond $2^s$ are not found, and thus, a bit shifting process is not effectively performed for Y component as shown in FIG. 11A.

Figure 11B:
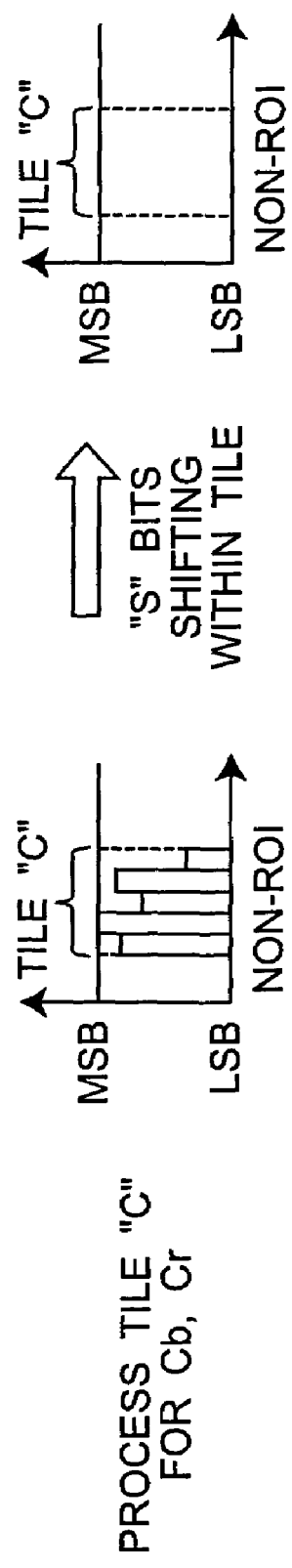
FIG. 11B is a schematic view illustrating a bit shifting process performed to non-ROI tile "C" for color difference component.

On the other hand, FIG. 11B is a schematic view illustrating a bit shifting process performed to non-ROI "C" for Cb, Cr components. As seen from FIG. 11B, quantized values of all transform coefficient (that is, quantized values of wavelet transform coefficient less than $2^s$) are shifted to LSB side by "S" bits for Cb, Cr components of non-ROI "C".

In this manner, non-ROI tile "C" is displayed in monochrome as a result of missing a color information.

Figure 12:
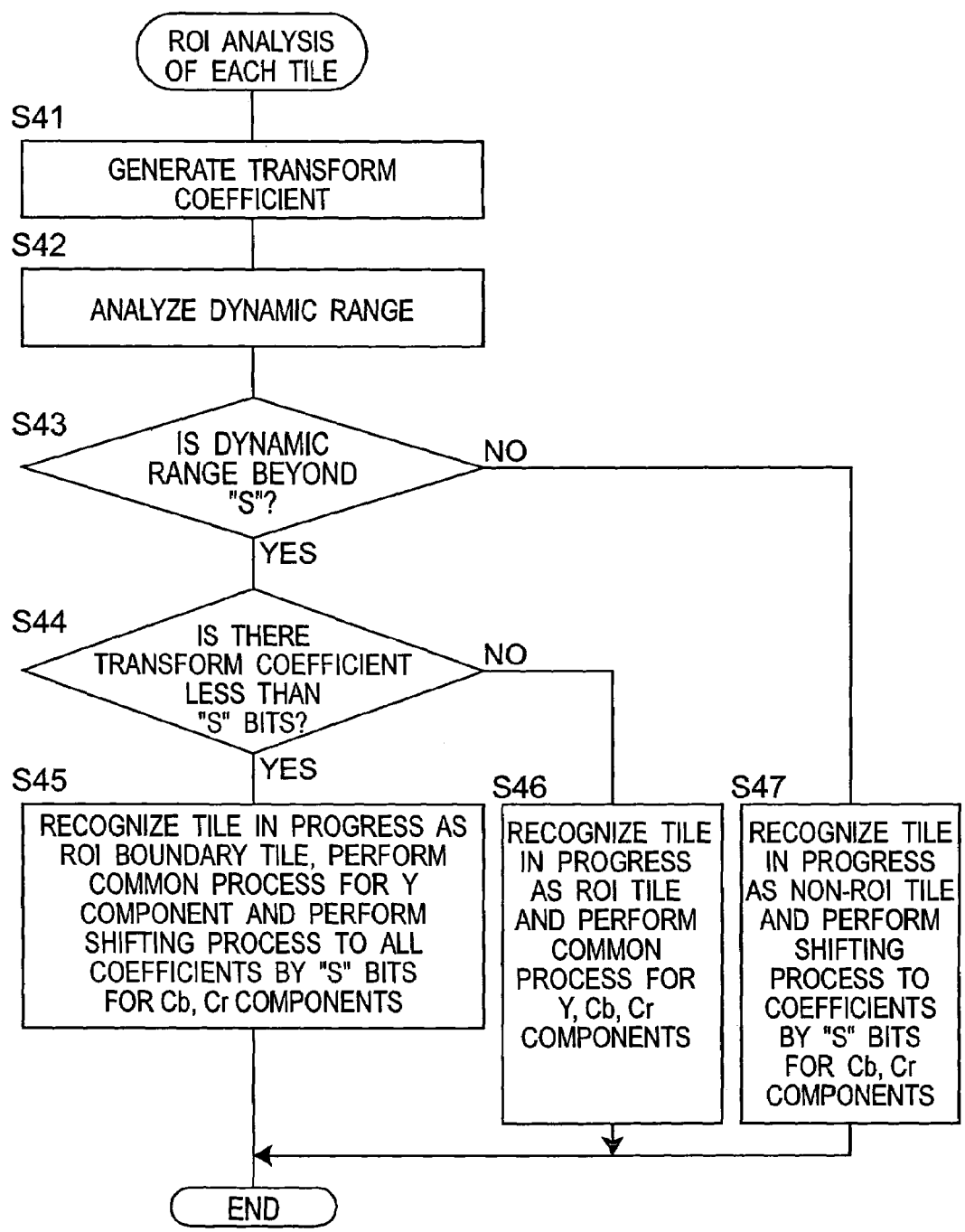
FIG. 12 is a flow chart of ROI analysis process for each tile according to the second embodiment of the present invention.

FIG. 12 is a flow chart of ROI analysis process for each tile according to the second embodiment of the present invention. First, a transform coefficient with coefficient bit modeling being dissolved is generated (step 41). Next, a dynamic range (lower limit to upper limit) of generated transform coefficients is analyzed (step 42). Namely, the number of bits of each transform coefficient is detected. Subsequently, it is determined whether the detected dynamic range is beyond bit shifting amount "S" of the max-shift method read from a header contained in strings of JPEG 2000 file (step 43).

As a result of step 43, when it is determined that the dynamic range is not beyond "S", the tile in. progress is recognized as non-ROI tile "C", and a common process is performed for Y component while a bit shifting process is performed for Cb, Cr components so that all transform coefficients within the tile are shifted to LSB side by "S" bits (step 47). Thus, transform coefficients of color component corresponding to non-ROI become zero. This is the end of the analyzing process.

On the other hand, as a result of step 43, when it is determined that the dynamic range is beyond "S", it is determined whether there is a transform coefficient less than "S" bits within the tile or not (step 44). As a result of step 44, when it is determined that there is not a transform coefficient less than "S" bits, the tile in progress is recognized as ROI tile "B" and a common process is performed for Y, Cb, Cr components and transform coefficients for which shifting resulted from the max-shift method being dissolved are obtained (step 46). This is the end of the analyzing process.

On the other hand, as a result of step 44, when it is determined that there is a transform coefficient less than "S" bits within the tile, the tile in progress is recognized as ROI boundary tile, and a common process is performed for Y component while a bit shifting process is performed for Cb, Cr component so that all transform coefficients are shifted to LSB side by "S" bits(step 45). Thus, transform coefficients of color component corresponding to non-ROI become zero and a common process is performed to transform coefficients corresponding to ROI so that transform coefficients for which shifting resulted from the max-shift method being dissolved are obtained. This is the end of the analyzing process.

As described above, in second embodiment, specific processes are performed to ROI tile "B", ROI boundary tile "A", non-ROI tile "C" for luminance component and color difference component and then it allows only ROI in image data to be displayed in full color. As a result, it is possible to generate an output from which a ROI can be recognized properly and without omission.

While the invention has been shown and described in detail, the foregoing description is in all aspects illustrative and not restrictive. It is therefore understood that numerous other modifications and variations can be devised without departing from the scope of the invention.

What is claimed is:

1. An image processing apparatus for decoding image data comprising frequency transform coefficients, the image data being divided to a plurality of tiles, each of which is in an encoding or decoding process, the image processing apparatus comprising:
    a detector which detects an existence status of a ROI set within said image data;
    a determiner which determines whether each tile is a ROI tile that is composed only of ROI coefficients, a non-ROI tile that is composed only of non-ROI coefficients, or a ROI boundary tile composed of both ROI coefficients and non-ROI coefficients based on said existence status of the ROI set detected by said detector; and
    a processor which performs a specific process for frequency transform coefficients of the ROI set and a non-ROI set within each tile for luminance component and color difference components,
    wherein said processor
    shifts the frequency transform coefficients to a lower bit side for luminance components and for color difference components for each tile determined to be a ROI tile,
    shifts the frequency transform coefficients to the lower bit side for color difference components for each tile determined to be a non-ROI tile,
    shifts the frequency transform coefficients to a lower bit side for the luminance components and for the color difference components corresponding to the ROI set for each tile determined to be a ROI boundary tile, and
    shifts the frequency transform coefficients to the lower bit side for the color difference components corresponding to the non-ROI set for each tile determined to be a ROI boundary tile.

2. The image processing apparatus according to claim 1, wherein said detector detects the existence status of the ROI set based on the frequency transform coefficients of said tile for every tile.

3. The image processing apparatus according to claim 1, wherein the processor shifts the frequency transform coefficients for the color difference components of the ROI boundary tiles and the non-ROI tiles such that the non-ROI of the image data after decoding is displayed in monochrome.

4. The image processing apparatus according to claim 3, wherein the processor shifts the frequency transform coefficients for the color difference components of the ROI boundary tiles and the ROI tiles such that the ROI of the image data after decoding is displayed in color.

5. An image processing apparatus for decoding image data comprising frequency transform coefficients, the image data being divided to a plurality of tiles, each of which in an encoding or decoding process, the image processing apparatus comprising:
    a detector which detects an existence status of a ROI set within said image data based on frequency transform coefficients of every tile;
    a determiner which determines whether each tile is a ROI tile that is composed only of ROI coefficients, a non-ROI tile that is composed only of non-ROI coefficients, or a ROI boundary tile composed of both ROI coefficients and non-ROI coefficients based on said existence status of the ROI set detected by said detector;
    a processor which performs a first process for each tile determined to be a ROI tile or a non-ROI tile, and which performs a second process for each tile determined to be a ROI boundary tile by said determiner;
    said first process shifts the frequency transform coefficients to a lower bit side for each tile determined to be a ROI tile, and
    said second process shifts the frequency transform coefficients to the lower bit side for each tile determined to be a ROI boundary tile.

6. An image processing apparatus for decoding image data comprising frequency transform coefficients, the image data being divided into a plurality of tiles, each of which is in an encoding or decoding process, the image processing apparatus comprising:
    a detector which detects an existence status of a ROI set within said image data;
    a determiner which determines whether each tile is a ROI tile that is composed only of ROI coefficients, a non-ROI tile that is composed only of non-ROI coefficients, or a ROI boundary tile composed of both ROI coefficients and non-ROI coefficients based on said existence status of the ROI set detected by said detector; and
    a processor which shifts frequency transform coefficients of said ROI set within each tile determined to be a ROI tile to a lower bit side, and which shifts frequency transform coefficients of both the ROI set and a non-ROI set within each tile determined to be a ROI boundary tile to the lower bit side.

7. The image processing apparatus according to claim 6, wherein said detector detects the existence status of the ROI set based on the frequency transform coefficients of said tile for every tile.

8. The image processing apparatus according to claim 6, wherein said processor shifts the frequency transform coefficients to the lower bit side for a tile determined to be a non-ROI tile which abuts with said ROI boundary tile.

9. The image processing apparatus according to claim 6, wherein the processor shifts the frequency transform coefficients for the ROI boundary tiles such that a bordering line around the ROI of the image data can be added.

10. The image processing apparatus according to claim 6, wherein the determiner determines whether each tile is a non-ROI tile bordering a ROI boundary tile, and
    wherein the processor shifts the frequency transform coefficients of a non-ROI tile bordering a ROI boundary tile to the lower bit side.

11. An image decoding apparatus for decoding a tile of image data comprising frequency transform coefficients, wherein the tile is one of a plurality of tiles of the image data, each tile being in an encoding or decoding process, the image decoding apparatus comprising:
    a dynamic range analyzer configured to analyze a dynamic range of the tile, wherein the dynamic range is based on a number of bits representing transform coefficients of the tile;
    a determiner configured to determine whether the tile is a ROI tile that is composed of only ROI coefficients, a non-ROI tile that is composed of only non-ROI coefficients, or a ROI boundary tile that is composed of both ROI coefficients and non-ROI coefficients based on the dynamic range of the tile analyzed by the dynamic range analyzer;

a processor configured to reduce the transform coefficients of the tile based on whether the tile is determined to be a ROI tile, a non-ROI tile or a ROI boundary tile, and wherein the processor is configured to reduce all transform coefficients of the tile by a predetermined reduction amount when the tile is determined to be a ROI boundary tile.

12. The image decoding apparatus according to claim 11, wherein the determiner is configured to determine that the tile is a non-ROI tile when the dynamic range of the tile is less than a predetermined dynamic range threshold, determine that the tile is a ROI tile when the dynamic range of the tile is equal to or greater than the predetermined dynamic range threshold and there are no transform coefficients of the tile that is less than the predetermined dynamic range threshold, and determine that the tile is a ROI boundary tile when the dynamic range of the tile is equal to or greater than the predetermined dynamic range threshold and there is at least one transform coefficient of the tile that is less than the predetermined dynamic range threshold.

13. The image decoding apparatus according to claim 12, wherein the predetermined reduction amount is equal to the predetermined dynamic range threshold.

14. The image decoding apparatus according to claim 12, wherein the determiner is further configured to determine whether the tile is a border non-ROI tile that is composed of only non-ROI coefficients and borders at least one ROI boundary tile, and wherein the processor is configured to reduce all of the transform coefficients of the tile by a predetermined reduction amount when the tile is determined to be a border non-ROI tile.

15. The image decoding apparatus according to claim 12, wherein the transform coefficients of the tile include luminance and color difference transform coefficients, and wherein when the tile is determined to be a ROI boundary tile, the processor is configured to reduce the luminance transform coefficients of the ROI set of the tile by a predetermined reduction amount, reduce the color difference transform coefficients of the ROI set of the tile by the predetermined reduction amount, leave unchanged the luminance transform coefficients of the non-ROI set of the tile, and reduce the color difference transform coefficients of the non-ROI set of the tile by the predetermined reduction amount.

16. The image decoding apparatus according to claim 15, wherein the predetermined reduction amount is equal to the predetermined dynamic range threshold.

17. The image decoding apparatus according to claim 15, wherein when the tile is determined to be a ROI tile, the processor is configured to reduce the luminance and the color difference transform coefficients of the tile by the predetermined reduction amount.

18. The image decoding apparatus according to claim 15, wherein when the tile is determined to be a non-ROI tile, the processor is configured to leave unchanged the luminance transform coefficients of the tile, and to reduce the color difference transform coefficients of the tile by the predetermined reduction amount.

19. The image decoding apparatus according to claim 12, wherein the transform coefficients of the tile include luminance and color difference transform coefficients, and wherein the processor is configured to reduce one or both of the luminance and color difference transform coefficients of the tile such that the ROI of the corresponding image data after decoding is displayed in full color and the non-ROI of the corresponding image data after decoding is displayed in monochrome.

20. A method of processing image for decoding image data comprising frequency transform coefficients, the image data being divided to a plurality of tiles, each of which is in an encoding or decoding process, the method comprising steps of:

detecting an existence status of a ROI set within said image data based on frequency transform coefficients of every tile;

determining whether each tile is a ROI tile that is composed only of ROI coefficients, a non-ROI tile that is composed only of non-ROI coefficients, or a ROI boundary tile composed of both ROI coefficients and non-ROI coefficients based on said existence status of the ROI set detected in said detecting step; and performing a first process for said ROI tile and said non-ROI tile determined in said determining step, and performing a second process for said ROI boundary tile determined in said determining step;

said first process is shifting the frequency transform coefficients to a lower bit side for each tile determined to be a ROI tile, and said second process is shifting the frequency transform coefficients to the lower bit side for each tile determined to be a ROI boundary tile.

* * * * *